Mar. 3, 1925. 1,528,502
E. R. MURPHY
MACHINE FOR DIGGING, SORTING, AND DELIVERING POTATOES.
Filed Sept. 6, 1922 4 Sheets-Sheet 1
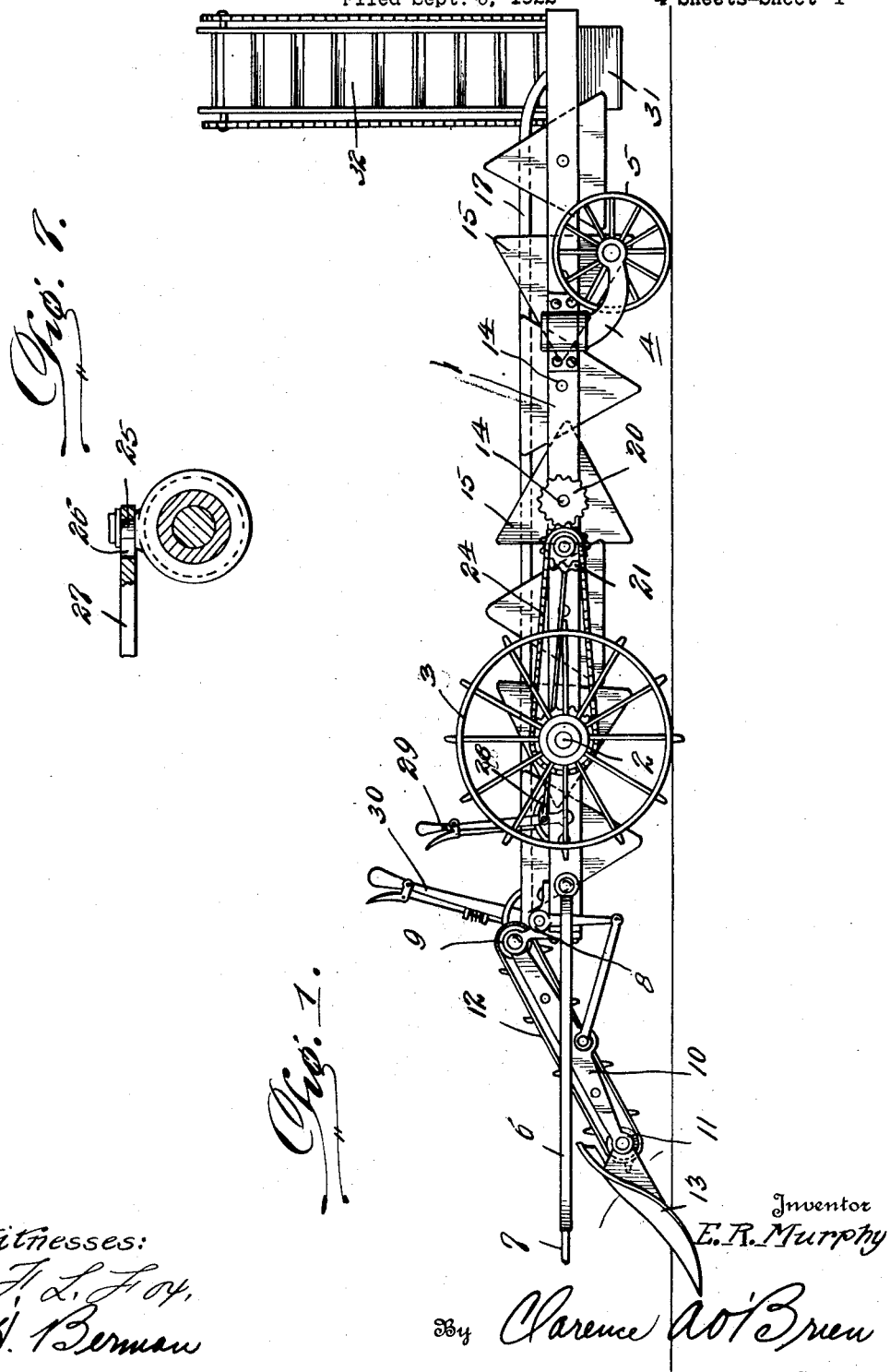
Witnesses:
Inventor
E. R. Murphy
By Clarence A. O'Brien
Attorney Mar. 3, 1925.  
E. R. MURPHY  
1,528,502  
MACHINE FOR DIGGING, SORTING, AND DELIVERING POTATOES  
Filed Sept. 6, 1922  
4 Sheets-Sheet 2
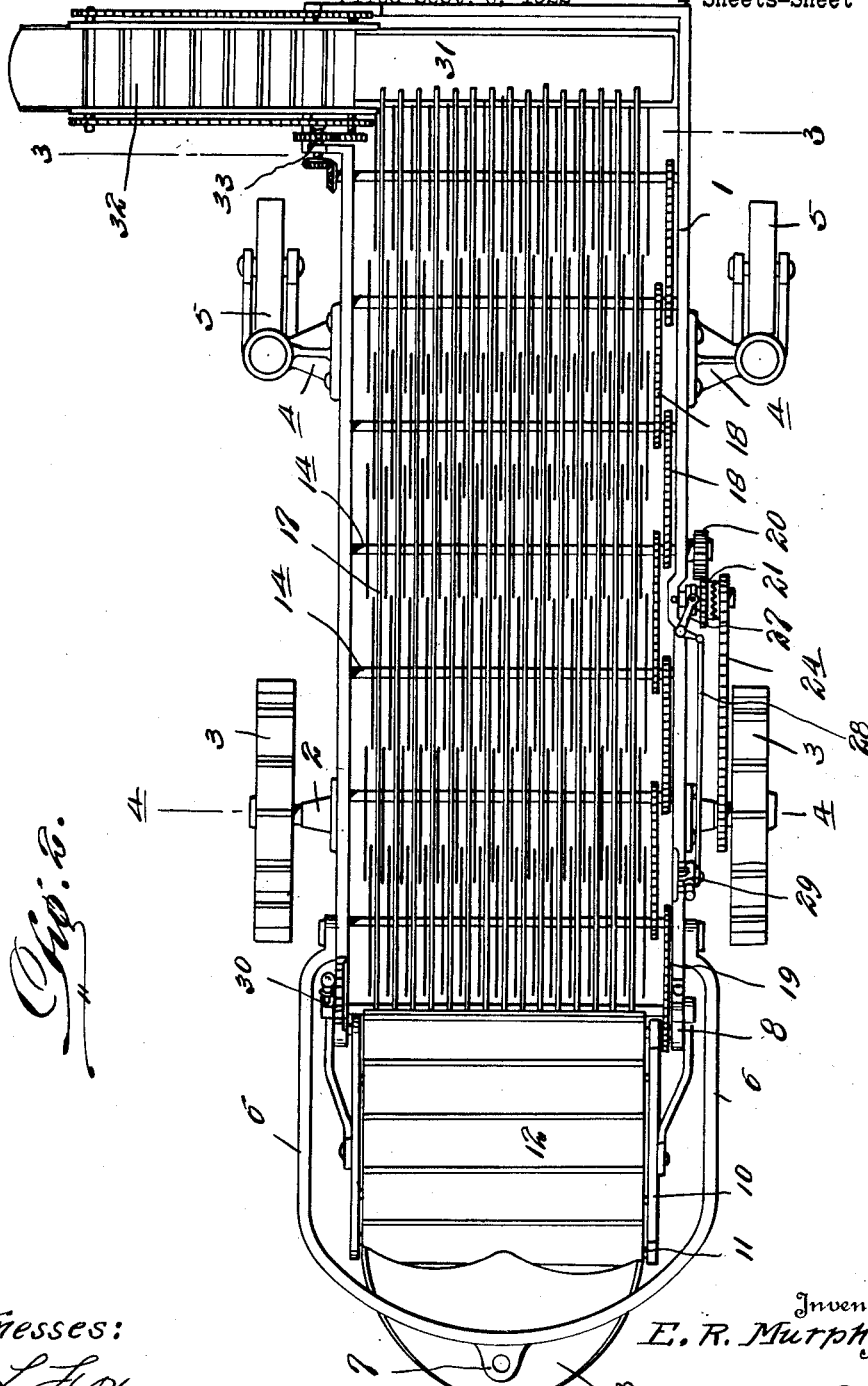
Witnesses:
Inventor  
E. R. Murphy,  
By Clarence A. O'Brien  
Attorney

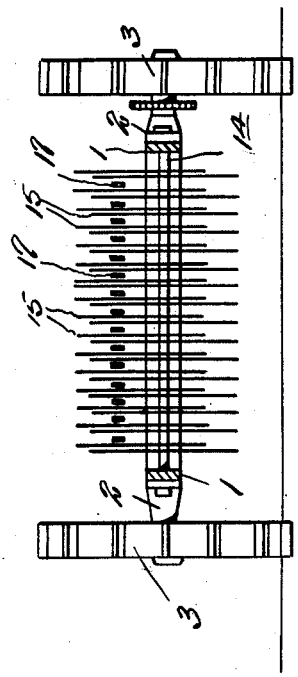
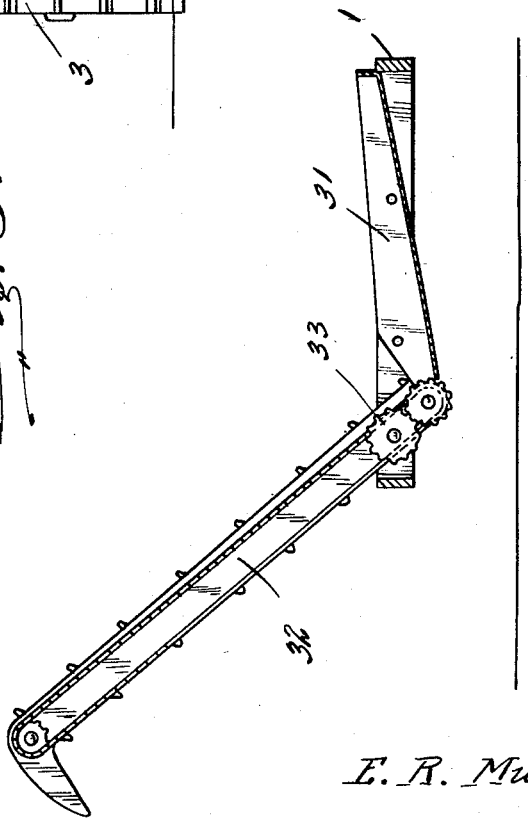

Mar. 3, 1925. 1,528,502
E. R. MURPHY
M CHINE FOR DIGGING, SORTING, AND DELIVERING POTATOES
Filed Sept. 6, 1922  4 Sheets-Sheet 4
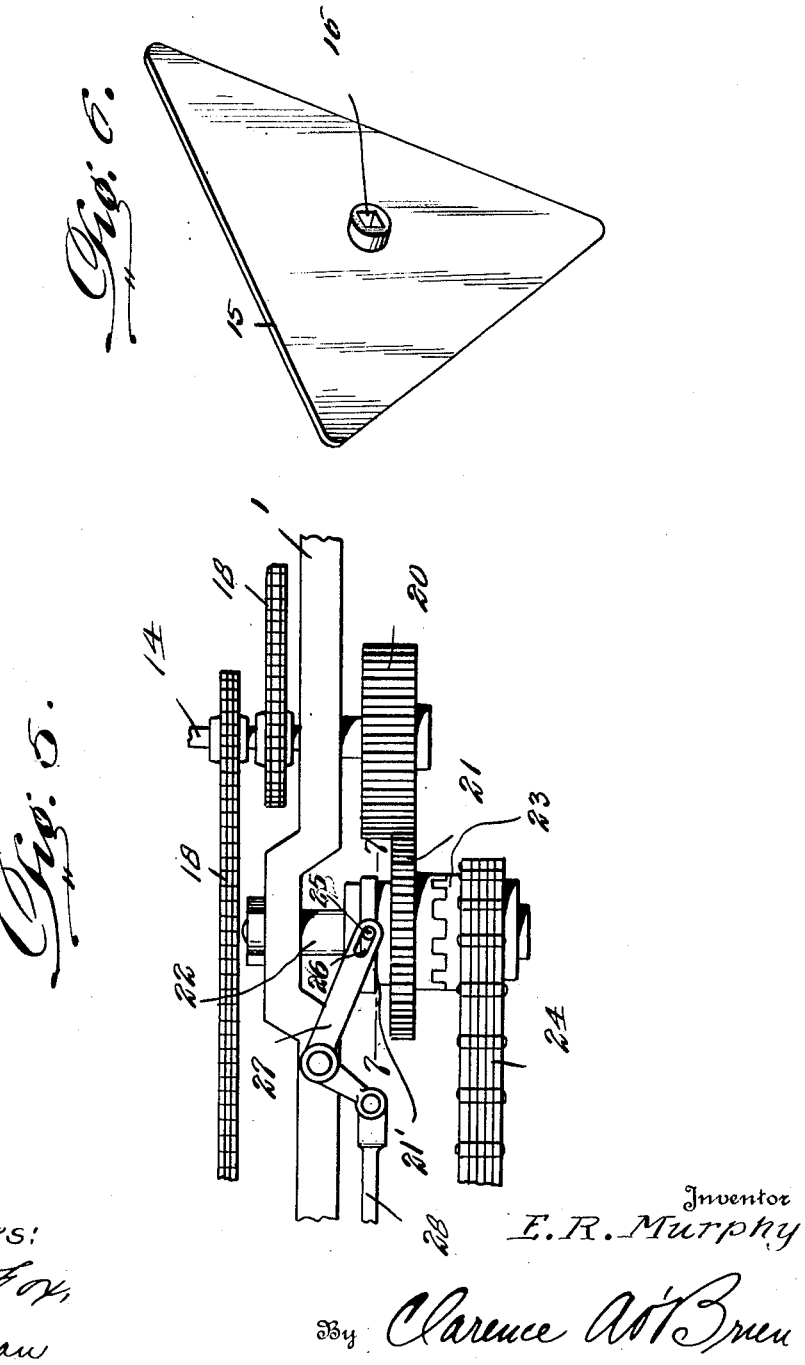
Witnesses:
F. L. Fox,
H. Berman
Inventor
E. R. Murphy
By Clarence A. O'Brien
Attorney Patented Mar. 3, 1925.

1,528,502

UNITED STATES PATENT OFFICE.

ERNEST R. MURPHY, OF BRAYTON, NEBRASKA.

MACHINE FOR DIGGING, SORTING, AND DELIVERING POTATOES.

Application filed September 6, 1922. Serial No. 586,409.

*To all whom it may concern:*

Be it known that I, ERNEST R. MURPHY, a citizen of the United States, residing at Brayton, in the county of Greeley and State of Nebraska, have invented new and useful Improvements in Machines for Digging, Sorting, and Delivering Potatoes, of which the following is a specification.

In carrying out the present invention it is my purpose to provide a machine for digging, sorting and delivering potatoes wherein the digger mechanism may be lowered and elevated at the will of the operator, wherein the separating mechanism will be constructed in such manner as to permit the small potatoes to fall back into the ground and discharge the larger potatoes onto a conveyor, the latter operating to deliver the potatoes to a wagon or other receptacle.

It is also my purpose to provide a machine of the class described which will embrace the desired features of simplicity, efficiency and durability, which will operate effectively for its intended purpose and which will embody comparatively few parts and these so arranged and correlated as to reduce the possibility of derangement to a minimum.

With the above recited objects in view, and others of a similar nature, the invention resides in the construction, combination and arrangement of parts set forth in and falling within the scope of the appended claim.

In the accompanying drawings:

Figure 1 is a view in side elevation of the machine constructed in accordance with my invention.

Figure 2 is a top plan view of the same.

Figure 3 is a cross sectional view on the line 3—3 of Figure 2.

Figure 4 is a similar view on the line 4—4 of Figure 2.

Figure 5 is an enlarged sectional view showing the clutch mechanism for controlling the agitating means.

Figure 6 is a perspective view of one of the agitator plates.

Figure 7 is a sectional view on the line 7—7 of Figure 5.

Referring now to the drawings in detail, 1 designates a frame of suitable construction and preferably rectangular in outline. Connected to the side bars of the frame 1 adjacent to one end thereof and extending laterally therefrom are stub axles 2 on which are mounted, respectively, ground wheels 3. Connected to the respective side bars of the frame 1 adjacent to the other end thereof and extending outwardly therefrom are brackets 4. Connected to the brackets 4 and depending therefrom are ground wheels 5. The connection between the ground wheels 5 and the brackets 4 is of the swivel type, so that the ground wheels 5 may turn in one direction or the other, according as the machine is turned. In advance of the ground wheels 3 the ends of a yoke 6 are connected to the respective side bars of the frame 1 and the central portion of the yoke beyond the frame is formed with an eye 7 by which horses or other draft animals or a tractor, if desired, may be connected to the frame in order that the latter may be drawn along on the ground wheels over the ground.

For convenience, I will term the end of the frame 1 in advance of the ground wheels 4 the front end and the other end of the frame behind the ground wheels 5 the rear end.

Connected to the frame 1 at the front end thereof and upstanding therefrom are brackets 8 and journaled in the upper ends of the brackets 8 is a drum 9. Also connected to the brackets 8 and extending downwardly and forwardly therefrom are side bars 10 spaced apart in parallelism and terminating short of the ground. Journaled in the lower ends of the side bars 10 is a drum 11. Trained over the drums 9 and 11 is an endless conveyor belt 12.

Connected to the lower ends of the arms 10 and extending downwardly and forwardly therefrom is a shovel 13 adapted to penetrate the earth, as shown in Figure 1 of the drawings, so that as the machine is drawn along over the ground with the shovel in the earth the potatoes will be gathered up by the shovel and deposited onto the conveyor belt 12. The separating or sorting means and the agitating mechanism are carried by the frame 1 between the side bars thereof and this mechanism embodies cross shafts 14 journaled in the side bars of the frame 1 and extending transversely of the frame. These transverse shafts 14 are spaced apart equal distances longitudinally of the frame and extend from one end to the other, as clearly illustrated in Figure 2 of the drawings. Upon each shaft 14 is a plurality of agitator plates 15 each triangular in shape and formed centrally with an opening in which is seated the collar 16, as clearly illustrated in Figure 6 of the drawings, the collar 16 on the plate encircling the shaft 14. These triangular shaped agitator plates are spaced apart equal distances longitudinally of the shaft, as clearly shown in Figure 2 of the drawings, and the plates 4 on one shaft alternate with those of the adjacent shafts and work between the plates of the adjacent shafts, as clearly shown in Figure 2 of the drawings. Extending longitudinally of the frame 1 are separator bars 17 spaced apart across the frame and between which the triangular shaped agitator plates work, as clearly illustrated in Figure 4 of the drawings, the apices of the plates rising above the separator bars in the rotation of the plates under the action of the shafts 14.

In the present instance, the shafts 14 are connected together for simultaneous rotation by means of chain and sprocket mechanism 18 and the shaft 14 at the forward end of the frame is connected through the medium of the sprocket and chain mechanism 19 with the upper conveyor drum 9, so that the conveyor 12 will be rotated in the rotation of the agitator plates.

In the present instance, one of the shafts 14 extends beyond the side bar of the frame 1 and is equipped with a relatively wide spur gear 20 with which meshes a narrow spur gear 21 that is fixed upon a collar 21' splined upon a stub shaft 22 carried by the adjacent side bar of the frame 1. This clutch collar 21' is movable into and out of engagement with a second clutch collar 23 that is rotatably mounted upon the shaft 22 and carries a sprocket wheel over which sprocket wheel and the sprocket wheel on the adjacent stub axle 2 is trained an endless chain 24. By means of this construction it will be seen that when the clutch collars 21' and 23 are in engagement with each other and the machine in operation motion will be transmitted from one ground wheel 3 through the chain 24, clutch collars and intermeshing gears 21 and 20 to the shafts 14. When, however, the clutch collar 21' is moved along the shaft 22 to disengage the clutch collar 23 the driving connection between the stub axle and the shafts 14 is broken. The clutch collar 21' is provided with an upstanding pin 25 that extends through a slot 26 formed in one end of a bell crank lever 27. This bell crank lever 27 is pivoted at its bight upon the adjacent side bar of the frame 1 and the other end thereof is connected through the medium of a rod 28 with a hand lever 29 pivoted upon the frame 1 at the forward end thereof.

The arms 10 that carry the conveyor at the forward end of the machine are capable of movement to regulate the depth of the shovel 13 into the earth and to disengage the shovel from the earth and in order to enable the bars 10 to be so manipulated, the hand lever 30 is pivoted upon the frame 1 and is suitably connected with the arms 10.

At the rear end of the frame 1 is a trough or pan 31 that extends across the frame 1 and is inclined from one end toward the other, as clearly shown in Figure 3 of the drawings. The lower end of the trough 31 communicates with a conveyor 32 that is suitably fastened to the frame 1 and uprises therefrom. In the present instance, the conveyor 32, which may be of any suitable or preferred construction, is driven from the rear transverse shaft 14 through a gear train 33, as clearly illustrated in Figure 2 of the drawings.

In practice, the shovel enters the earth as the machine is drawn along and deposits the potatoes on the conveyor belt 12 and as the conveyor belt is operated, such potatoes are thrown onto the separator bars 17 and under the influence of the triangular shaped agitator plates 15. As the plates 15 rotate the potatoes are carried along the separator bars and the smaller potatoes fall through the bars onto the ground, while the larger potatoes are delivered into the trough or pan 31, whence they fall onto the conveyor 32, from which they may be delivered to a wagon or other receptacle.

By reference to Figure 1 of the drawings, it will be noted that the various sets of agitator plates are so timed with respect to one another that the potatoes are driven along the separator bars uniformly, so as to avoid congestion on the bars and are delivered to the pan or trough 31 continuously, so as not to overload the conveyor 32 at any time.

From the foregoing description, taken in connection with the accompanying drawings, it will be seen that I have provided a machine for digging, sorting and delivering potatoes whereby the potatoes will be acted upon without bruising or cutting and wherein the component parts are so arranged and correlated as to reduce the possibility of derangement to a minimum and at the same time permit access to be had thereto easily and quickly for repairs, replacements, etc.

I have entered into a detailed description of the construction and relative arrangement of parts embraced in the present and preferred embodiment of my invention with a view to imparting a full, clear and exact understanding of the said embodiment. I do not desire, however, to be understood as confining myself to the said specific construction and relative arrangement of parts, inasmuch as in the future practice of my invention such changes or modifications may be made as fairly fall within the scope of my invention as defined by my appended claim.

Having thus described the invention, what is claimed as new, is:—

A potato harvester comprising a frame, wheels supporting the frame in a horizontal position, a digger and elevator carried at the forward end of the frame, spaced rods disposed longitudinally of the frame, shafts journaled in the frame and disposed transversely thereof and located below the rods, means for rotating all of the shafts in the same direction and from the supporting wheels of the frame, plates in the form of equilateral triangles mounted at their centers upon the shafts and disposed through the spaces between the rods, the plates upon one shaft having edge portions which overlap the edge portions of the plates upon the next adjacent shafts, the plates being so positioned upon the shafts that the plates upon alternate shafts have parallel edges during rotation and at times during the rotation have pointed corner portions which project above the plane in which the upper edges of the rods lie, and at other times have side edges which lie in the said plane, the parts being so arranged that the potatoes which are delivered from the elevator upon the rods are permitted to pass at intervals along the upper sides of the rods and at other intervals are lifted above the rods and partially or completely turned by the plates and permitted to gravitate upon the rods as the pointed ends of the plates pass below the rods.

In testimony whereof I affix my signature.

ERNEST R. MURPHY.